United States Patent [19]

Vilceanu et al.

[11] 3,932,139
[45] Jan. 13, 1976

[54] REACTOR FOR THE CATALYTIC AMMONIA SYNTHESIS AT HIGH TEMPERATURES AND PRESSURES

[75] Inventors: Marin Vilceanu, Bucharest; Constantin Bors, Fagaras, both of Romania

[73] Assignee: Combinatul Chimic Fagaras, Fagaras, Romania

[22] Filed: Jan. 2, 1974

[21] Appl. No.: 429,783

Related U.S. Application Data

[63] Continuation-in-part of Ser. No. 164,582, July 21, 1971, abandoned.

[52] U.S. Cl. .............. 23/288 L; 23/288 K; 23/289; 423/360; 423/361
[51] Int. Cl.[2] ...................... B01J 8/04; C01C 1/04
[58] Field of Search .. 23/288 L, 289, 288 R, 288 K; 423/360, 361

[56] References Cited
UNITED STATES PATENTS

| | | | |
|---|---|---|---|
| 1,932,247 | 10/1933 | Kniskern | 23/289 |
| 2,740,803 | 4/1956 | Dorschner | 23/288 L X |
| 3,041,151 | 6/1962 | Christensen | 23/289 |
| 3,197,288 | 7/1965 | Johanson | 23/289 |
| 3,212,862 | 10/1965 | Christensen | 23/289 |
| 3,488,161 | 1/1970 | Herp, Jr. | 23/289 |

Primary Examiner—James H. Tayman, Jr.
Attorney, Agent, or Firm—Karl F. Ross; Herbert Dubno

[57] ABSTRACT

A reactor for the catalytic synthesis of ammonia at high temperature and pressure from nitrogen and hydrogen wherein the intertubular spaces of the heat exchange zone are filled with metallic balls; the tubular spaces contain metal bars with square cross section; triple concentric tubes are present in the preheating and reaction zone to reach optimal temperature conditions; a demister is provided for the retention of oil at the entrance of the synthesis gas into the intertubular spaces of the heat-exchange zone; and a bag-shaped distribution chamber is provided between the reaction and preheating zone and the heat exchange zone.

12 Claims, 5 Drawing Figures

REACTOR FOR THE CATALYTIC AMMONIA SYNTHESIS AT HIGH TEMPERATURES AND PRESSURES

This application is a continuation-in-part of patent application Ser. No. 164,582, filed July 21, 1971 now abandoned.

Field of the Invention

THe present invention relates to a reactor for catalytic ammonia synthesis from nitrogen and hydrogen, and represents an advance over our prior invention as described in patent application Ser. No. 164,582.

Background of the Invention

The reactor according to the prior application is composed of a heat exchanger equipped with a packing of either inert or catalytically effective metal balls, both in the tubular space (within the tubes) as well as in the intertubular space (around and in contact with the tubes) to facilitate maintaining temperature conditions in the catalytic mass with heat transfer; double concentric or coaxial tubes are used within the catalytic mass, of which the inner tubes with variable thickness present a tapered profile, and are provided at their lower end, over a substantial part of their length, with insulation by means of synthesis gas cushions.

When the reactor is operated with synthesis gas having an inert-gas content of less than 20%, an adiabatic zone with a thin catalyst layer and with radial gas flow is used, while at the outlet of the gas from the adiabatic zone, the latter is provided with a mixing chamber with normal or helical gas flow.

With synthesis gas having an inert-gas content in excess of 20%, the catalytic layer with radial gas flow and the mixing chamber are replaced by an adiabatic catalytic layer surmounting the heat-transfer catalytic layer and in direct contact therewith. We have now found that, although the reactor system described in the aforementioned application represents a major advance over the art therein cited, there are some disadvantages:

a. The use of metal balls in the tubular space (within the tubes) of the lower heat exchanger results in excessively high gas velocities and in an undesirable pressure drop within the reactor, leading to an additional mechanical loading of the interior of the column having a collapsing effect on the latter, a pressure increase inside the synthesis unit thus limiting the capacity of the entire plant, and additional power consumption for the gas circulation.

To clarify this point, we wish to observe that the use of metal balls within the tubes of the lower heat exchanger may be effective for low and moderate gas speeds utilized most frequently. However, for high speeds of the gas in these tubes, the balls have been found to be disadvantageous. We describe below, a solution to this problem whereby metal bars with square cross-section may be used in place of the metal balls. Thus the bars are preferred in the case of high speeds where the use of the metal balls may lead to an undesirable pressure in the reactor.

b. The double concentric tubes with a tapered inner tube of variable thickness are difficult to manufacture owning to their considerable length (e.g. about 10m.)

The double concentric tubes with a tapered inner tube of variable thickness and an insulating cushion as described in the prior application are preferred for small or intermediate lengths. We have described below a system in which three concentric tubes are used in place of the above-described structure for increased or considerable lengths.

c. Deterioration of heat transfer in the reactor due to carbonization of the oil entrained with the synthesis gas entering the reactor. Ammonia synthesis units generally use reciprocating, oil-lubricated compressors for the circulation of the synthesis gas.

The penetration of oil drops or solid particles into the reactor is a generally undesirable phenomenon and for this reason it has been found to be important to remove them before they enter the intertubular space of the heat exchanger. However, we have found it to be possible to avoid carbonization in the metal ball packing but nevertheless desire to exclude such particles.

In ammonia synthesis reactors are settling of the catalyst takes place with time, which is more significant with smaller grain size. In reactors of the type described, this may cause premature elimination from the reaction process of the adiabatic catalytic zone with radial gas circulation by the formation of preferential channels (channeling of the catalyst bed). To eliminate the channeling effect, it is necessary to supply an additional quantity of catalyst. Such an operation, however, is not possible in the case of welded constructions because it is generally not possible to reweld a material which has already operated in a corrosive hydrogen and nitrogen medium. Moreover, the dismantling and removal of the inner elements of a column involve significant losses of production, time and labor.

Description of the Invention

The reactor, according to the present invention, represents an improvement over our earlier system by replacing the metal balls inside the tubular space with metal bars with square cross-section; for cooling the catalyst, instead of double concentric tubes, three ordinary concentric (coaxial) tubes are used; and for the retention of the oil entrained by the synthesis gas, at the inlet for the synthesis gas into the intertubular space of the lower heat exchanger, an oil demister consisting of metal screens, is provided with the oil thus separated being collected at the base of the reactor wherefrom it is withdrawn periodically to compensate for settling of the catalyst mass, we provide tubes of a suitable size and material while employing a generally flat pill-box or bag-shaped gas distribution chamber between the catalytic zone and the lower heat exchanger.

Description of the Drawing

The above and other objects, features and advantages of the present invention will become more readily apparent from the following description, reference being made to the accompanying drawing in which.

Specified Description and Examples

The catalytic reactor illustrated in the drawing, comprises a generally tubular body formed with passages and the like for the movement of the gases through the system in their distinct passes, as will be apparent hereinafter. Initially the synthesis gases move downwardly through the tubular structure, then upwardly through a lower heat exchange zone, distribution chamber, an upper heat exchange zone and catalyst zone (in succession), and downwardly through the upper heat exchange zone and catalyst zone and then through the lower heat exchange zone prior to being discharged from the reactor. In addition, at least in the upper heat exchange and catalyst zones, a threedirection system is provided whereby the gas first flows upwardly, then downwardly and thereafter upwardly. Of course, the number of passes may be increased.

In the structure described below, similar reference numerals are used to identify identical structural elements.

EXAMPLE 1

When using synthesis gases with a low inert gas content, below 20%, designed for current production processes, the synthesis reactor according to the invention is that presented in FIG. 1.

The synthesis gas enters the reactor at its top 1, passes by a downward helical motion through an annular space "$a$" between the resisting jacket 2 of the reactor and sleeve 3, where it is heated to 50° – 60°C on account of heat losses of the sleeve 3.

By this flow, heating above 100°C of the tubular housing 2 is avoided.

Subsequently, the gas passes through metallic sieves or openings 4 and enters the intertubular space "$b$" of a heat exchanger 5, where it is heated by the heat of the reaction gases leaving the reactor, the openings 4 being intended for the retention of mechanical particles eventually carried along by the gas and for supporting the ball packing 6. The metal balls 6, made of plain carbon steel with a determined degree of surface finish, fill the intertubular space "$b$" of the heat exchanger 5 in order to intensify the heat transfer. The level of ball filling of the intertubular space "$b$" allows for fluidization of these balls and provides a means for self-cleaning in case these balls are clogged up with impurities deposited during the operation. The balls with a precatalytic character within the intertubular space "$b$" occupy a determined volume of this latter, namely, the upper half of the metal ball layer 6; this depends on the catalyst and on the minimal reduction temperature, selected so that the time for reducing the catalytic metal balls is shorter than the time for reducing the synthesis catalyst.

From the intertubular space "$b$" of the heat exchanger 5, the gas heated to a temperature of 300° – 350°C passes through a perforated plate 7, which is intended to prevent the eventual carrying along by the gas of the metal balls 6 in case of their fluidization or in case of flow rate fluctuations.

Subsequently, the gases are collected in a distribution chamber "$c$", wherefrom they enter into double concentric tubes consisting of an outside tube 8 and an inside concentric tube 9, between tubes 8 and 9 being disposed guiding ribs 10, FIG. 4.

The gas passes through the double concentric tubes by entering at the lower end of the inside tube 9, where it is heated up to 370°C, passing then through the upper end into the annular space "$d$" between the concentric tubes 8 and 9 and flowing downwards is further heated up to 400° – 410°C by the reaction heat within a catalyst layer 11 with heat transfer within which are disposed the concentric tubes.

Figures 2, 4:
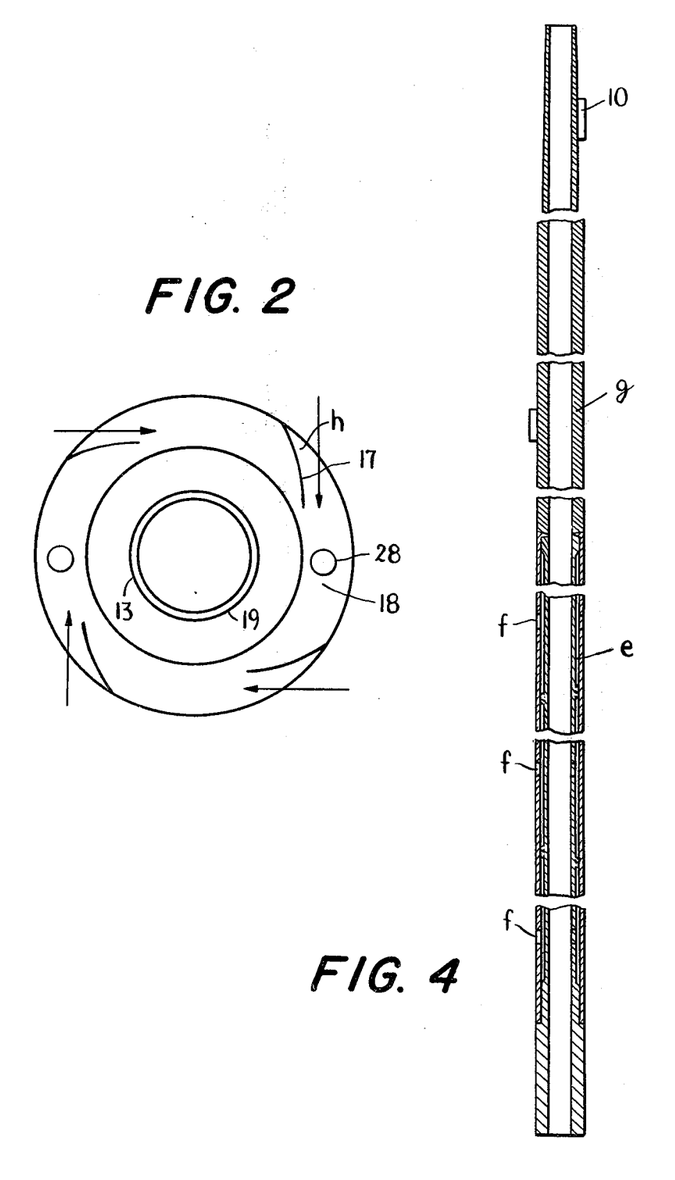
FIG. 2 is a transverse section taken along the line A — A of FIG. 1.
FIG. 4 is a cross-sectional view through a double concentric tube arrangement with tapering wall thickness.

As seen in FIG. 4, the construction of the inside tube 9 presents at the upper part a variable thickness with conical profile which ensures, by variable gas velocity, a controlled heat transfer, in order to attain the optimal temperature curve in the catalyst mass.

Moreover, in order to attain the optimal temperature curve in the catalyst mass and to ensure the temperature necessary for starting the reaction at the inlet of the gas into another catalyst layer 12, disposed at the upper part of the reactor, the inside tube 9, as seen in FIG. 4, is provided at its lower part with a portion "$e$" of thermal insulation with a gas cushion; tube 9 is also fitted with releases "$f$" for pressure equalizing (FIG. 4).

Subsequently, the gas leaves the double concentric tubes through the lower end of tube 8 and enters into the annular space "$g$" between a central pipe 13 and an electric heater 14, where it is heated up to a temperature of 410°–420°C, the gas entering then at this temperature radially into the catalyst layer 12.

The catalyst layer 12 is placed in a tapered perforated basket lined with sieves 15 and forms an adiabatic catalytic zone in which the gas temperature rises up to 510°–520°C, the evolved heat self-accelerates the reaction of the gases leaving the catalyst zone 12 and entering a mixing chamber 16. The height to thickness ratio of the catalyst layer 12 is of about 5:1. The role of the catalytic zone 12 is to prevent the rise of the gas temperature above 520°C by a corresponding heat dispersion, as well as tempering the reaction from the kinetic point of view; this reaction may be further controlled in the catalyst layer 11 by suitably constructing this latter.

Into the mixing chamber 16 (FIG. 2), the gases enter through the orifices "$h$", being directed tangentially by the blades 17 placed between ring 18 and the bottom of the catalyst basket 15; the resulting whirling motion is such that the gases are homogenized so as to eliminate the negative effect eventually produced by the formation of preferential gas channels flowing through the catalyst layer 12.

Thus, the catalyst basket lined with sieves 15 and the mixing chamber 16 provided with normal or helical gas flow are integral, their assembly may be dismounted from the rest of the sleeve 3 by means of the tube 19 gliding on the central pipe 13.

From the mixing chamber 16, the gases pass through a perforated plate 20, lined with metallic sieves 21 and enter then into the catalyst layer 11 with heat transfer.

The gases then flow through the annular space "$i$" between the distribution chamber "$c$" and the sleeve 3, entering into a tubular space of the heat exchanger 5, also filled with metal balls 25 of the same size as the balls 6 and 22, the metal balls 25 being sustained by rings 26.

The clogging of the tubular space "$j$" containing the metal balls 25 with catalyst particles carried along by the gas is not possible, because the gas velocity by its traversing this layer of balls 25 is about 4 times greater than by its traversing the layer of balls 22.

At higher velocities of the gas, the metal balls 25 may be replaced by square section rods.

The gases then leave the heat exchanger 5, cooled down to a temperature of 200°–250°C, and leave the reactor at its lower part.

To regulate the temperature conditions in the catalyst layers 11 and 12, the reactor is provided with a cold gas supply 27, bringing cold gas into the intertubular space "$b$" of the heat exchanger.

To measure the temperature in the catalyst layers 11 and 12, the reactor is provided with two symmetrically disposed sheaths 28.

Since the heat exchanger 5 has a small size, concentrating high temperature gradients, it is fitted with tubular plates, tube sheets 29, thermally protected with asbestos sheets 30.

EXAMPLE 2

Figure 3:
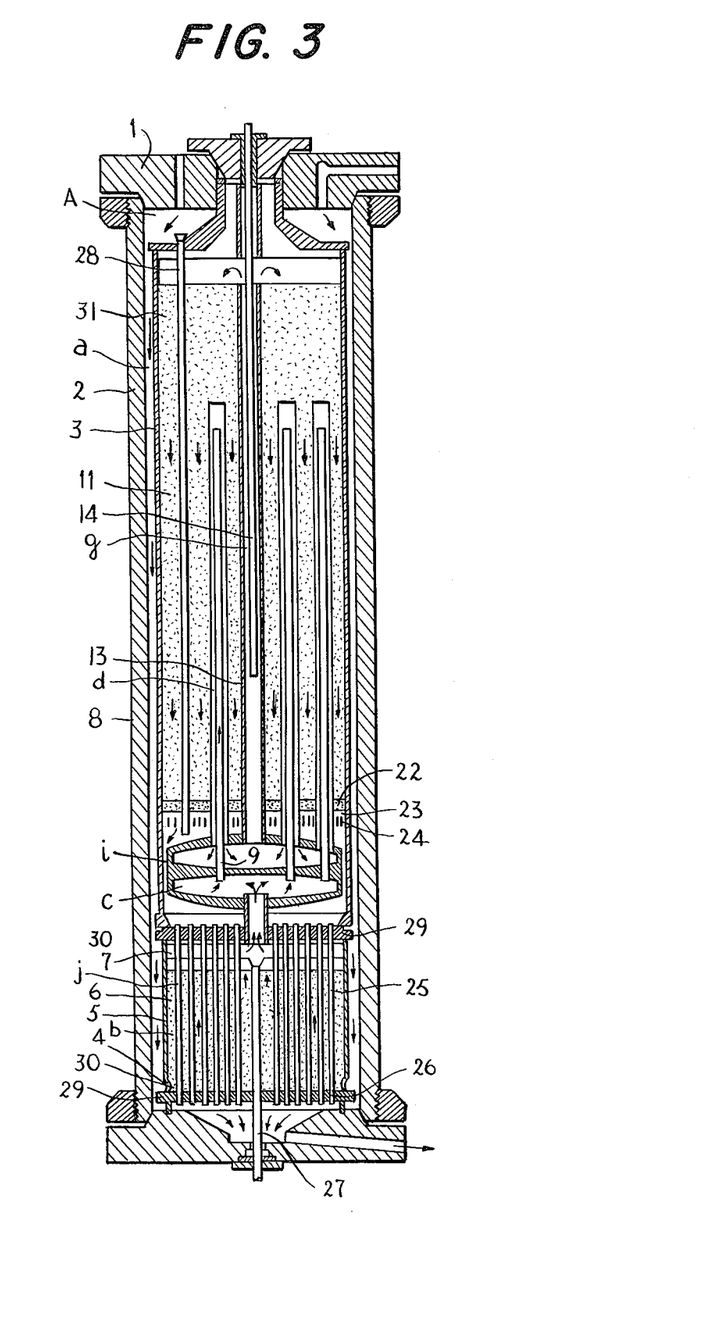
FIG. 3 is an axial cross-sectional view through another embodiment of the invention.

When using synthesis gas with a high inert gas content of more than 20%, when using purge gas from the synthesis aggregates of ammonia plants, the synthesis reactor used is that in FIG. 3.

Figure 1:
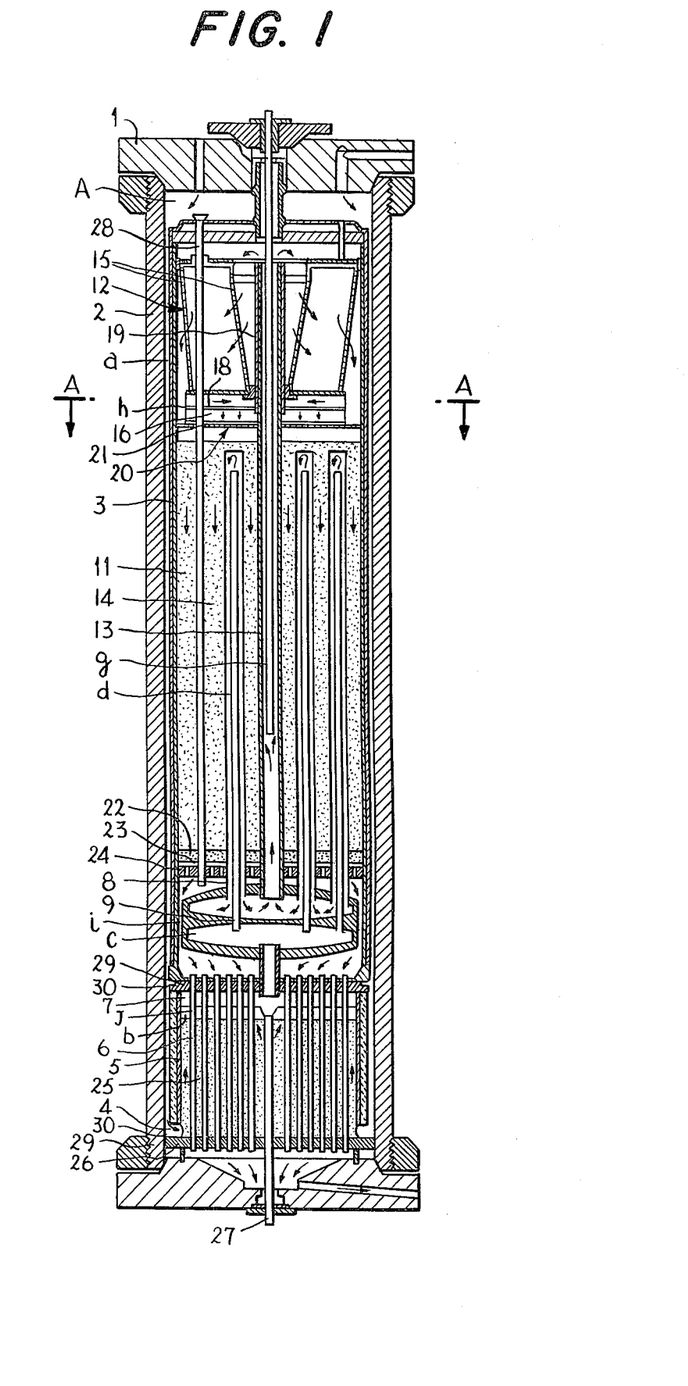
FIG. 1 is an axial cross-sectional view of the reactor disclosed in the prior application.

This constructional alternative is similar to that corresponding to FIG. 1. However, the reactor is no longer provided with the adiabatic catalyst layer 12, with radial flow of gas and mixing chamber 16, these being replaced with the adiabatic catalyst layer 31, placed directly over the catalytic layer 11 with heat transfer (FIG. 3).

The advantages of the reactor, according to the invention, are the following:
  twofold production capacity with respect to the existing reactors, this being achieved by increasing the catalyst volume by 50%, and by attaining and maintaining optimal operational temperature conditions;
  the use of the metal-ball-heat-exchanger has a simple and robust construction and a volume about four times smaller than the usual heat exchanger;
  local overheating is avoided, a particularly important fact for the life and activity of the catalyst;
  safety in operation by avoiding thermal stresses;
  flexible construction, as the adiabatic catalyst layer with radial gas flow and the mixing chamber are dismountable.

Figure 5:
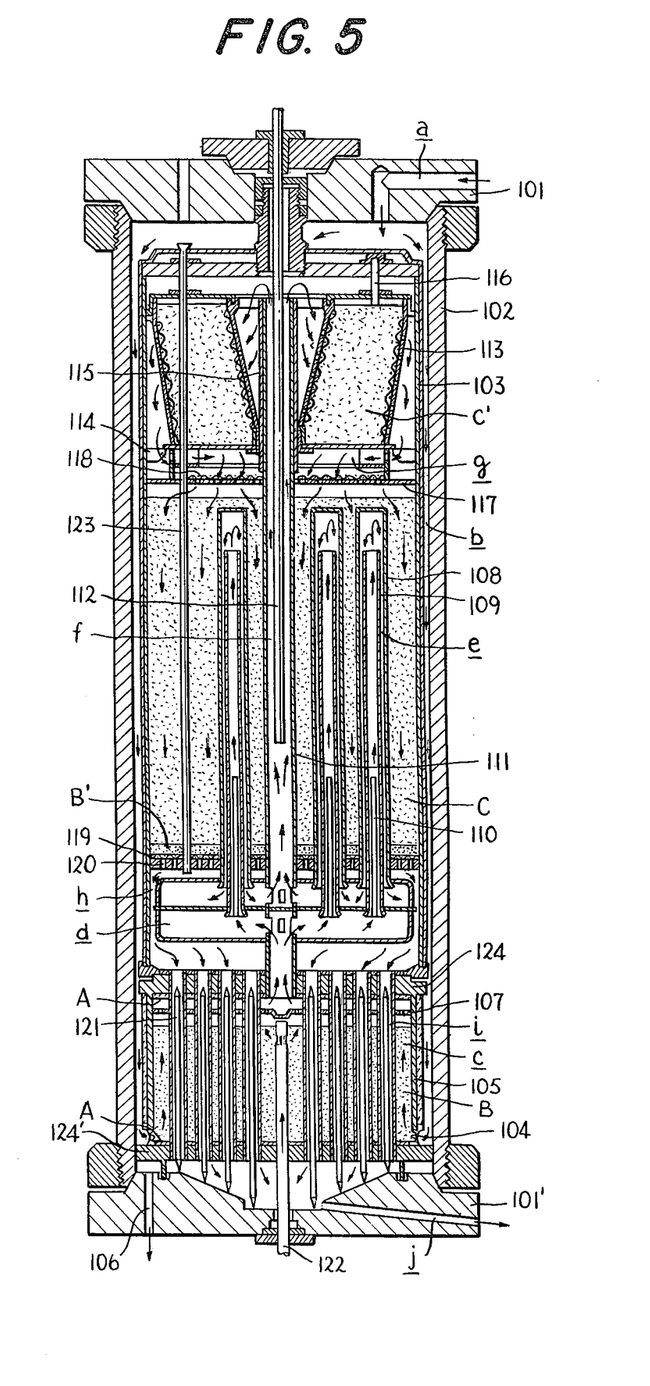
FIG. 5 is an axial cross-sectional view through a further development of the basic concept.

The reactor of FIG. 5, according to the invention, comprises an upper and a lower lid 101, 101' in the form of disk-shaped cover plates having frustoconical central bodies seated axially against frustoconical inner edges of a tubular housing 102. Thus cylindrical tubular housing is threaded at its end to receive retaining nuts flanged to cover plates 101 and 101' by the usual flange bolts (not illustrated) enabling the cover plates 101 and 101' to be drawn axially and sealingly against the respective seats if the tubular housing 101.

The housing 102 receives a sleeve 103 which is coaxial with the housing wall and defines an annular space $b$ therewith extending substantially the full length of the housing between the cover plates 101 and 101'. At its upper end, the sleeve 103 is fitted with a plate mounted on this cover plate 101 by a tubular fitting while, at its lower end, the sleeve 103 is positioned and axially retained by a centering ring at the upper part of a lower heat exchanger represented generally at 105.

The lower heat exchanger 105, which occupies the remainder of the axial space between the cover plates, defines with the tubular housing 102 an extension of the space $b$ which opens via a demister 104 into the interior of the lower tubular housing 105.

The upper cover plate 101 is formed with an inlet $a$ for the synthesis gas and defines with the upper positioning plate of the sleeve 103 a gas-distribution space communicating with space $b$.

The demister 104, as will be described in greater detail hereinafter, comprises openings formed at the lower end of the heat exchanger 105 and is provided with a number of metal screens designed to remove oil droplets entrained by the gases, prior to entry of the latter into the lower heat exchanger 105.

The lower heat exchanger 105 comprises a pair of axially spaced tube sheets 124, 124', spaced apart by a sleeve integral with the tube 124 and extending axially downwardly from tube sheet 124 and welded, close to the demister 104, to the tube sheet 124'. This sleeve is formed with the radial ports which are closed between the inner tubular space of the heat exchanger 105 and the annular space $b$, forming the demister via screens provided over or within these ports. The tubed $i$ of heat exchanger 105 terminate at opposite ends in the tube sheets 124 and 124' while the intertubular space $c$ is filled with metal balls B. Each of these tubes $i$ is provided with a respective rod or bar 121 of square cross-section, at least over the major part of the length of tube $i$, the upper ends of the rods or bars being pointed and terminating in a common plane. The pointed lower ends of the rods or bars 121 rest upon the inwardly and downwardly convergent frustoconical surfaces formed by a recess in the lower cover plate 101' so that the lengths of the rods or bars increase outwardly from tube $i$ to tube $i$. Within the next exchanger 105, there is provided an upper screen plate 107 to limit upward movement of the mass of balls B and a central tube 122 which extends through a sealing gland in the lower plate 101', passes through the lower tube sheet 124' and terminates, with radial openings, at the upper portion of the mass of balls B filling the interior tubular space $c$ of the lower heat exchanger 105.

The lower heat exchanger 105 is provided, at its upper tube sheet, with an upwardly extending duct 111 passing through the sleeve 103 coaxially therewith over substantially the entire length of this sleeve but terminating immediately below the upper end-closing and centering plate thereof. The central duct 111 is subdivided axially into a lower portion communicating between the interior tubular space $c$ of the lower heat exchanger into the compartment $d$ of a distribution chamber. The latter is of flat pillbox configuration and is centrally subdivided by the partition by the upper and lower chambers the latter chamber being that represented at $d$. The partition supports an array of free-standing tubes 109 which rise within the catalyst and heat exchange mass generally represented at C in the drawing. The free-standing tubes 109 are provided, at their lower end, with central bodies 110 and extend coaxially with the tubes 110, into blind-end tubes 108. The upper extremities of the tubes 108 are closed and the lower extremities of these tubes are anchored in the upper wall of the flat distribution chamber which has a disk configuration when, as in the embodiment illustrated, the reactor has a right-circular-cylindrical configuration.

The flat-disk-shaped distribution chamber defines a space $b$ within the sleeve 103 between the upper tube sheet 124 and a perforated plate 120, filling the sleeve 103 around the upper portion of central duct 111. The latter is provided in the upper compartment of the distribution chamber with inlets which permit gases to flow through the interior of this duct to the upper end of the sleeve 103 around an electrical heating element 112 extending coaxially from the upper plate 101 into the duct 111. Above the upper heat exchange mass, there is provided a partition 117, the inner portion of which is formed as a screen plate and is lined with sieve-like metal plates 118. The partition 117 is surmounted by a cylindrical perforated wall through which gas may pass in the inner direction as represented at g. A horizontal plate closes the top of the chamber g and rests upon laterally inwardly extending supports 114 of the sleeve 103. This plate forms the bottom of a screen lined frustoconical basket 113 having a pair of downwardly convergent frustoconical walls with the same angle of conicity defining between them an annular space field with a catalyst C' of constantly-diminishing flow cross-section in the downward direction but constant interference width. The upper catalyst chamber is likewise described in greater detail below.

The synthesis gas enters the reactor through channel a provided in an upper lid 101 of the reactor and flows in a downward helical movement through the annulus b situated between a supporting jacket tubular housing 102 of the reactor and a sleeve 103, where the gas is heated to a temperature of 50° – 60° C due to the heat losses of the sleeve 103.

Due to this circuit the heating beyond 100° C of the tubular housing 102 of the reactor is avoided.

The gas then passes through a demister 104 consisting of metal screens, and then enters an intertubular space c of a heat exchanger 105, where it is heated at the expense of the heat of the reacted gas leaving the reactor. The demister 104 ensures a thorough screening of the gas and it supports a layer of metal balls B with which the intertubular space c is filled, while the separated-out oil droplets are bled-off periodically through nipple 106.

Balls B, with or without catalytic action and having a certain degree of superficial finish, fill the intertubular space c of the heat exchanger 105 in order to intensify the heat exchange as well as to achieve a final precatalytic action of the gas, i.e. methanization of CO and $CO_2$ traces in the synthesis gas.

The metal ball packing B with precatalytic character inside the intertubular space c occupy a predetermined volume therein, namely the upper half of the layer of balls B, depending on the nature of the catalyst and on the minimum reduction temperature, provided the reduction time of the catalytic balls B is less than the reduction time of the ammnonia synthesis catalyst.

From the intertubular space c of heat exchanger 105 the gas, preheated to a temperature of 300° – 350° C passes through a strainer plate 107 provided to retain possible metal balls B being entrained by the gas in case of fluidization or of flow surges.

The gas is then collected in a distribution chamber d from where it enters a set of catalyst cooling systems C each cooling system being three common concentric tubes 108, 109, 110, placed inside the catalytic mass C.

The distribution chamber d being designed in the shape of a bag, does not support the weight of the catalytic layer C but only the difference in pressure from inside towards the exterior.

The gas flows through the three concentric tubes as follows: it enters the central tube 110 through the lower end, and flowing upwards, enters the intermediate concentric tube 109, where it is heated up to 370°C, and then enters the upper part of the annulus e between concentric tubes 108 and 109, and then, flowing downwards, is further heated to 400° – 410° C at the expense of the reaction heat of the catalytic layer C. The mutual arrangement of tubes 108, 109 and 110 is designed to obtain optimum temperature.

After leaving the concentric tubes 108, 109 and 110 through the lower part of tube 108, the gas enters the annulus f between a central tube 111 and an electric heater 112, where it is further heated to a temperature of 410° – 420° C, this being the temperature at which the gas passes radially through a catalytic layer C'.

The catalytic layer C' is placed in a tapered arrangement in a perforated basket 113 lined with metal screens and constitutes an adiabatic catalytic zone C' where the gas temperature increases up to 510° – 520° C, the discharged heat self-accelerating the reaction of the gas leaving the catalytic zone C' and entering a mixing chamber g with a centrifugal mixing effect.

The screen lined basket 113 and the mixing chamber g are built as a single unit resting on supports 114, and this assembly may be dismantled from the sleeve 103 with the aid of a tube 115 gliding on a central tube 111.

For the supplementation of the settled-down catalyst in the taper-shaped catalytic layer C', tubes 116 are provided, enabling expansion of basket 113, at the same time a good seal being achieved with the aid of a convenient system of bushings not shown on the drawing. not shown on the drawing.

From the mixing chamber g, the gas passes through a screen plate 117 lined with metal sieves 118 in order to anihilate the grinding effect of the catalyst C' by the turbulent currents created inside the mixing chamber g.

Then the gas passes through the catalytic layer C where by a suitable cooling of the gas the optimum temperature is achieved.

Upon leaving the catalytic zone C the gas which has not reacted passes through a layer of balls B' where the particles of catalyst C are retained, and then through sieves 119 and a screen plate 120'.

The reacted gas passes through an annulus h between the distribution chamber d and the sleeve 103 and enters the annulus i of heat exchanger 105 provided with square metal bars 121 supported by the lower cap 101' of the reactor, or by an inner cap or other constructive variants.

The reacted gas leaves heat exchanger 105 cooled down to a temperature of 200° – 300° C, and then leaves the reactor through its lower part through channel j.

For adjustment of the temperature inside the catalytic layers C and C', the reactor is provided with a gas supply duct 122 through the ball filling B, supplying cool gas into the intertubular space c of heat exchanger 105.

For the measurement of temperatures inside the catalytic layers C and C', the reactor is equipped with thermo-wells 123.

Because of the small dimensions of the heat exchanger 105 concentrating high temperature gradients, the heat exchanger is provided with the tube sheets 124, protected by asbestos sheets A.

We claim:

1. A reactor for the catalytic synthesis of ammonia from a gas mixture, comprising:
   a. a tubular elongated housing formed with an inlet at one end thereof for introduction of said gas mixture;
   b. a sleeve received within said housing and defining an annular space therewith communicating with said inlet;
   c. at heat exchanger received within said housing and axially aligned with said sleeve while defining an extension of said space with said housing, said heat exchanger comprising a pair of axially spaced-apart sheets, a plurality of heat exchanger tubes extending parallel to the axis of said housing between said tube sheets, and a packing of metal balls between said tube sheets and within an intertubular space defined between said tubes and between said tube sheets;

d. respective metal rods extending through said tubes with clearance;

e. means in said heat exchanger proximal to the other end of said housing for communicating between said annular space and said intertubular space;

f. a distribution chamber within said sleeve and communicating with said intertubular space;

g. a porous catalyst body within said sleeve between said distribution chamber and said one end of said housing;

h. a plurality of heat-exchanger tubes extending from said distribution chamber into said porous catalyst body for conducting the gas mixture from said distributor into heatexchanging relationship with said catalyst body;

i. duct means for passing said gas mixture through said catalyst body upon traversal by said mixture of said heatexchange tubes in the direction of said heat exchanger to form a reaction gas mixture, said reaction gas mixture passing through the tubes of said heat exchanger;

j. means for conducting said reaction gas mixture from said housing at said other end thereof, said means at said heat exchanger proximal to said other end of said housing being a demister for removing oil droplets from said gas mixture prior to entry of said gas mixture into said heat exchanger; and k. means for removing collected oil from said demister at said other end of said housing.

2. The reactor defined in claim 2 wherein said heat exchange tubes each comprise at least three coaxial tubes of different length.

3. The reactor defined in claim 2, further comprising means at said one end of said housing for replenishing the catalyst of said body.

4. The reactor defined in claim 2, further comprising a tube in said sleeve at said one end of said housing for replenishing catalyst of said body upon the settling thereof.

5. A reactor for the catalytic synthesis of ammonia from a gas mixture, comprising:

a. a tubular elongated housing formed with an inlet at one end thereof for introduction of said gas mixture;

b. a sleeve received within said housing and defining an annular space therewith communicating with said inlet;

c. a heat exchanger received within said housing and axially aligned with said sleeve while defining an extension of said space with said housing, said heat exchanger comprising a pair of axially spaced-apart sheets, a plurality of heat exchanger tubes extending parallel to the axis of said housing between said tube sheets, and a packing of metal balls between said tube sheets and within an intertubular space defined between said tubes and between said tube sheets;

d. respective metal rods extending through said tubes with clearance;

e. means in said heat exchanger proximal to the other end of said housing for communicating between said annular space and said intertubular space;

f. a distribution chamber within said sleeve and communicating with said intertubular space;

g. a porous catalyst body within said sleeve between said distribution chamber and said one end of said housing;

h. a plurality of heat-exchanger tubes extending from said distribution chamber into said porous catalyst body for conducting the gas mixture from said distributor into heatexchanging relationship with said catalyst body;

i. duct means for passing said gas mixture through said catalyst body upon traversal by said mixture of said heatexchange tubes in the direction of said heat exchanger to form a reaction gas mixture, said reaction gas mixture passing through the tubes of said heat exchanger;

j. means for conducting said reaction gas mixture from said housing at said other end thereof, said distributor comprising a flat circular chamber and a partition subdividing said chamber into a first compartment turned toward said heat exchanger and a second compartment turned toward said catalyst body, said heat-exchanger tubes including tubes mounted on said partition and communicating with said one compartment and blind tubes coaxially receiving said first tubes and communicating with said other compartment, said means at said heat exchanger at said other end of said housing including a demister for removing oil droplets from said mixture; and k. means for removing collected oil from said demister.

6. The reactor defined in claim 5 wherein said duct means includes a duct extending centrally through said catalyst body and communicating with said other compartment, said catalyst body comprising an upper body portion received in a basket surrounding said duct and a lower portion mounted on a perforated sieve plate, said duct communicating at said other end of said housing with the interior of said upper body portion.

7. The reactor defined in claim 6, further comprising an electric heater received in said duct for initially heating said gas mixture to an elevated temperature.

8. The reactor defined in claim 7 wherein said rods are of square cross-section.

9. A reactor for the catalytic synthesis of ammonia from a mixture of gases at high temperature and pressure, comprising:

a. a tubular housing;

b. a sleeve within said housing and defining an annular space therewith;

c. first means forming an inlet at one end in said housing communicating with said space for passing a reactive gas mixture through said space to the other end of said housing;

d. openings provided at said other end in said sleeve for admitting said gas mixture to the interior thereof;

e. a metal ball packing in said sleeve adjacent said other end and forming a heat-exchange zone traversed by said mixture in the direction of said one end and in direct contact with said mixture;

f. a reaction and preheating zone in said sleeve ahead of said heat-exchange zone in said direction and filled with a reaction-promoter catalyst;

g. second means for passing said mixture from said heat-exchange zone through said reaction and preheating zone in indirect heat exchange with said reaction-promoter catalyst;
h. a central tube extending through said reaction and preheating zone and traversed by said mixture following passage thereof through said reaction and preheating zone;
i. heating means in said tube for initiating a reaction on said mixture;
j. third means at said one end of said housing for feeding the reacting gas mixture from said tube through said reaction and preheating zone in direct contact with said catalyst in the opposite direction;
k. tubes containing another metal ball packing extending through said heat exchange zone in indirect exchange relation with the first-mentioned metal ball packing;
l. means for passing said reacting gas mixture from direct contact with said catalyst through said tubes containing said other metal ball packing;
m. means at said other end for passing cold gas through the intertubular spaces in said heat-exchange zone;
n. a tapered-sieve frustoconical catalyst basket filled with a catalyst layer to serve as an adiabatic zone at said one end traversed by said reacting gas mixture following passage thereof through said tube and prior to passage thereof through said reaction and preheating zone in direct contact with reaction-promoter catalyst; and
o. a mixing chamber adjacent said basket, said chamber having at one side a homogenizing compartment and at the other side a quiescent compartment formed with a perforated plate traversed by said gas mixture following passage thereof through said basket and prior to passage thereof through the reaction and preheating zone in direct contact with said reactionpromoter catalyst, said mixing chamber being provided with means for inducing helical gas flow.

10. A reactor for the catalytic synthesis of ammonia from a mixture of gases at high temperature, comprising:
an elongated tubular upright housing;
a sleeve received within said housing and defining an annular space there around said sleeve leading from an upper end of said housing toward the lower end thereof;
a lower heat exchanger in said sleeve, said lower heat exchanger communicating with said space at its bottom through a plurality of orifices in said sleeve and comprising a packing of metal balls and a multiplicity of upright tubes traversing said packing and filled with metal balls, at least the metal balls of said packing in the upper half thereof having catalytic activity;
a body of a reaction-promoter catalyst within said sleeve above said lower heat exchanger and communicating at its lower end with the tubes of said lower heat exchanger;
a plurality of double concentric tubes extending through said body and each including an inner tube communicating with the packing of said lower heat exchanger upwardly through said body, and an outer tube surrounding each inner tube for conducting the gases traversing the latter downwardly around the respective inner tube and discharging them below said body, said inner tubes being of progressively diminishing wall thickness upwardly and being provided at least at their lower ends with means forming annular compartments around said inner tubes and orifices communicating between the interior of said inner tubes and said annular compartments;
duct means extending through said body for collecting gases discharged by said outer tubes and leading the latter gases upwardly through said body for subsequent passage downwardly therethrough around said double concentric tubes and said duct means;
means for recovering an ammonia-containing gas from the tubes of said lower heat exchanger at the bottom of said housing;
means for feeding a mixture of ammonia-producing gas into said housing at the upper end thereof; and
means for controlledly admitting cool gas into the spaces between the tubes of said lower heat exchanger for controlling the reaction condition in the reactor.

11. A reactor for the catalytic synthesis of ammonia from a mixture of gases at high temperature, comprising:
an elongated tubular upright housing;
a sleeve received within said housing and defining an annular space there around said sleeve leading from an upper end of said housing towards the lower end thereof;
a lower heat exchanger in said sleeve, said lower heat exchanger communicating with said space at its bottom through a plurality of orifices formed in said sleeve and comprising a packing of metal balls and a multiplicity of upright tubes traversing said packing and filled with metal balls, at least the metal balls of said packing in the upper half thereof having catalytic activity;
a body of a reaction-promoter catalyst within said sleeve above said lower heat exchanger and communicating at its lower end with the tubes of said lower heat exchanger;
a plurality of double concentric tubes extending through said body and each including an inner tube communicating with the packing of said lower heat exchanger upwardly through said body, and an outer tube surrounding each inner tube for conducting the gases traversing the latter downwardly around the respective inner tube and discharging them below said body, said inner tubes being of progressively diminishing wall thickness upwardly and being provided at least at their lower ends with means forming annular compartments around said inner tubes and orifices communicating between the interior of said inner tubes and said annular compartments;
duct means extending through said body for collecting gases discharged by said outer tubes and leading the latter gases upwardly through said body for subsequent passage downwardly therethrough around said double concentric tubes and said duct means;
means for recovering an ammonia-containing gas from the tubes of said lower heat exchanger at the bottom of said housing;
means for feeding a mixture of ammonia-producing gas into said housing at the upper end thereof;
means for controlledly admitting cool gas into the spaces between the tubes of said lower heat exchanger for controlling the reaction condition in the reactor;

means forming an adiabatic zone between the outlet of said duct means at said upper end of said housing and said body of reaction-promoter catalyst, said adiabatic zone being formed as a tapered catalyst body;

means providing radia gas circulation through the tapered catalyst body; and means forming a mixing chamber at a lower portion of said adiabatic zone.

12. A reactor for the catalytic synthesis of ammonia from a mixture of gases at high temperature, comprising:

an elongated tubular upright housing;

a sleeve received within said housing and defining an annular space there around said sleeve leading from an upper end of said housing toward the lower end thereof;

a lower heat exchanger in said sleeve, said lower heat exchanger communicating with said space at its bottom through a plurality of orifices formed in said sleeve and comprising a packing of metal balls and a multiplicity of upright tubes traversing said packing and filled with metal balls, at least the metal balls of said packing in the upper half thereof having catalytic activity;

a body of a reaction-promoter catalyst within said sleeve above said lower heat exchanger and communicating at its lower end with the tubes of said lower heat exchanger;

a plurality of double concentric tubes extending through said body and each including an inner tube communicating with the packing of said lower heat exchanger upwardly through said body, and an outer tube surrounding each inner tube for conducting the gases traversing the latter downwardly around the respective inner tube and discharging them below said body, said inner tubes being of progressively diminishing wall thickness upwardly and being provided at least at their lower ends with means forming annular compartments around said inner tubes and orifices communicating between the interior of said inner tubes and said annular compartments.

duct means extending through said body for collecting gases discharged by said outer tubes and leading the latter gases upwardly through said body for subsequent passage downwardly therethrough around said double concentric tubes and said duct means;

means for recovering an ammonia-containing gas from the tubes of said lower heat exchanger at the bottom of said housing;

means for feeding a mixture of ammonia-producing gas into said housing at the upper end thereof;

means for controlledly admitting cool gas into the spaces between the tubes of said lower heat exchanger for controlling the reaction condition in the reactor; and an adiabatic catalyst layer overlying said body and interposed between the latter and the outlet of said duct means and said upper end of said housing.

* * * * *